Nov. 30, 1948.　　　　S. C. COPELAND　　　　2,455,233
AUTOMATIC THROTTLE CONTROL
Filed Aug. 7, 1946　　　　　　　　　　2 Sheets-Sheet 1
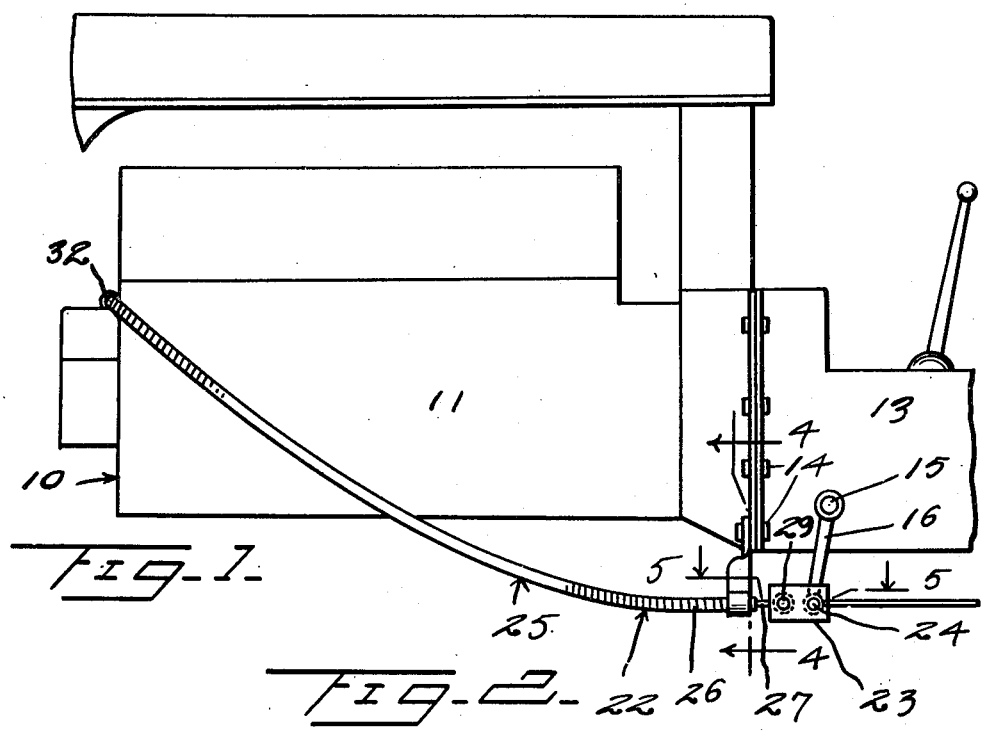
Inventor
*Shirley C. Copeland*
By *Randolph & Beavers*
Attorneys

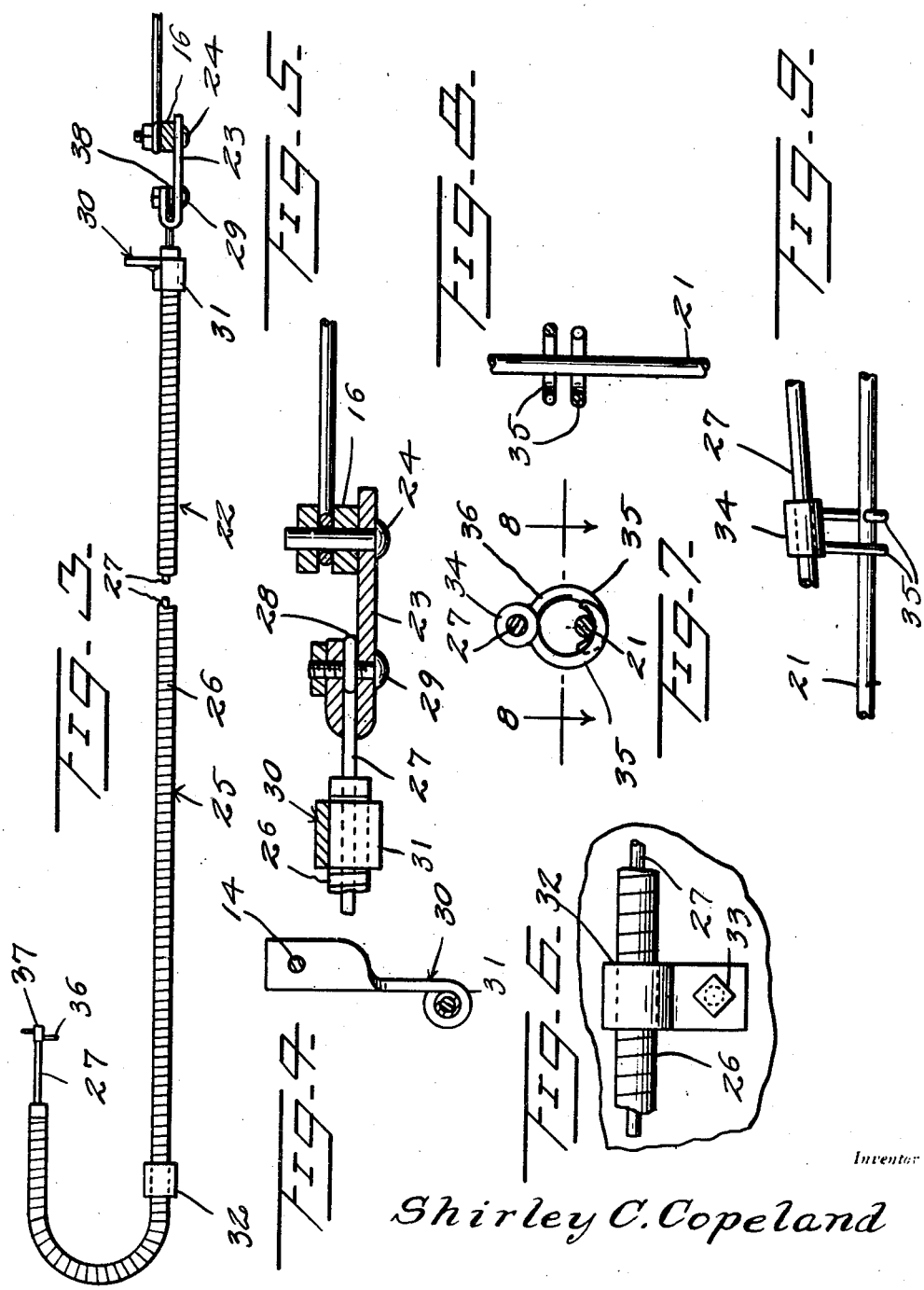

Patented Nov. 30, 1948

2,455,233

UNITED STATES PATENT OFFICE 2,455,233

AUTOMATIC THROTTLE CONTROL

Shirley Clyde Copeland, Mansfield, Tex., assignor of one-half to Earl C. Porter, Dallas, Tex.

Application August 7, 1946, Serial No. 689,005

1 Claim. (Cl. 192—.01)

This invention relates to a novel construction of throttle control especially adapted for use on tractors and which is adapted to be actuated by the depressing of the tractor clutch to reduce the supply of the fuel mixture to the carburetor to cause the tractor engine to be slowed down to an idling speed.

Tractors are generally operated by use of a hand throttle and considerable difficulty is encountered in starting, stopping and shifting gears and properly regulating the throttle to prevent racing of the engine and to avoid jerking of the vehicle. Much difficulty is encountered in shifting gears of a tractor while operating with a hand throttle due to the difficulty in slowing down the engine simultaneously with the release of the clutch to prevent racing of the engine and in again speeding up the engine simultaneously with the engagement of the clutch to avoid jerking and to prevent strain on the clutch and transmission.

With the present invention, the hand throttle is set and left at a position to cause operation of the engine at the desired speed and the release of the clutch in stopping or preparing to shift gears automatically causes the engine to be slowed down as the clutch is released. The engagement of the clutch in starting or after shifting gears automatically causes the engine to speed up and resume its normal operating speed.

Still a further aim of the invention is to provide an automatic throttle for tractors which, in addition to reducing wear on the tractor will result in appreciable saving in fuel consumption and wear and tear on the tractor tires.

Various other objects and advantages of the invention will hereinafter become more fully apparent from the following description of the drawings, which illustrate a preferred embodiment thereof, and wherein:

Figure 1 is a side elevational view showing one side of a tractor engine and with the automatic throttle applied thereto;

Figure 2 is a similar view looking toward the opposite side of the tractor engine and showing the automatic throttle in position thereon;

Figure 3 is an enlarged top plan view of the automatic throttle shown removed;

Figure 4 is an enlarged cross sectional view thereof taken substantially along a plane as indicated by the line 4—4 of Figure 1;

Figure 5 is an enlarged horizontal sectional view taken substantially along a plane as indicated by the line 5—5 of Figure 1;

Figure 6 is an elevational view showing the part of the throttle, disposed across the front of the engine;

Figure 7 is an enlarged cross sectional view taken substantially along a plane as indicated by the line 7—7 of Figure 2;

Figure 8 is a horizontal sectional view taken substantially along a plane as indicated by the line 8—8 of Figure 7, and Figure 9 is a side elevational view of the connection shown in Figures 7 and 8.

Referring more specifically to the drawings, 10 designates generally an internal combustion engine of a tractor or similar vehicle, the left side thereof, looking from rear to front of the vehicle, being designated 11 and the opposite, right hand side being designated 12. The vehicle transmission, not shown, is contained with a housing 13 located to the rear of the engine 10 and including sections secured together by a plurality of fastenings 14. The clutch shaft 15 projects outwardly from the left-hand side of the transmission housing 13 and is provided with an arm or lever 16 which is keyed thereto and which normally depends therefrom. The engine 10 is provided with a conventional carburetor 17 located on the right-hand side 12 thereof, and located on the same side and forwardly of the carburetor 17 is a conventional governor 18 provided with an upwardly extending lever 19 which is connected to a lever arm 20 of the carburetor 17 by a rigid link 21. The lever arm 20 is connected to a conventional butterfly valve or similar means, not shown, for regulating the flow of the combustible mixture through the carburetor 17 to the cylinders of the internal combustion engine 10.

The parts previously described are all of conventional construction in certain types of conventional tractors and have been illustrated and described merely to better illustrate the automatic throttle control, designated generally 22 and comprising the invention.

The automatic throttle control 22 includes a bar 23, as best seen in Figures 3 and 5, having a nut and bolt fastening 24 adjacent one end thereof by means of which the bar 23 is pivotally connected to the lower end of the clutch shaft arm 16.

A flexible shaft, designated generally 25 includes a flexible conduit 26 in which a relatively heavy gauge strand of wire 27 is slidably mounted. As best seen in Figure 5, one end of the wire strand 27 protrudes from an end of the flexible conduit 26 and extends through an opening in a turned-back end 28 of the bar 23. A nut and bolt fastening 29 extends through the bar 23 and through the turned-back part 28 to clamp said end of strand 27, so that said bar forms a rigid link between the arm 16 and the flexible shaft 25. A bracket 30 is provided with a sleeve portion 31 at its lower end which is clamped around the conduit 26, adjacent the end of the strand 27, clamped in bar 28. The bracket 30 is attached to one of the fastenings 14 for supporting the end of the flexible shaft 25, which is located adjacent to the clutch lever arm 16.

As best seen in Figure 1, the flexible shaft 25 extends forwardly and across the forward end of the engine 10 and is connected to the forward end of the engine by means of a clamp 32 which is attached by a bolt 33 to the engine block.

As best seen in Figures 7, 8 and 9, a collar 34 is clamped to the opposite, exposed end of the strand 27 and is provided with two depending hooks 35, the bills of which project in opposite directions and which are disposed in spaced-apart relationship, as best seen in Figure 9. The hooks 35 engage around the rod 21 adjacent the lever 19 and due to the fact that the strand 27 is set at an angle relatively to the rod 21, tend to frictionally engage the rod 21 when strand 27 is moved toward the right (Figure 9).

Assuming that the control arm 20 is connected by suitable linkage, not shown, to a conventional hand throttle and that the hand throttle is set to operate the engine 10 at an accelerated speed, preparatory to starting up, the tractor clutch is released causing the shaft 15 and the arm 16 to swing in a counter-clockwise direction, as seen in Figure 1. This will cause the wire strand 27 to be moved from left to right, as seen in Figures 1 and 2 for thereby swinging the valve lever 20 in a clockwise direction, as seen in Figure 2 to decelerate the engine to idling speed to enable the engine to be placed in gear. As the clutch is engaged the shaft 15 and the arm 16 will swing in an opposite clockwise direction to move the shaft or strand 27 in the opposite direction to thereby release the rod 19 so that the valve lever 20 can be moved in the opposite direction or counter-clockwise by the governor arm 19 back to its preset position to admit additional fuel to the cylinders for accelerating the engine as the clutch is engaged. It will thus be readily apparent that the automatic throttle control 22 will function to cause the vehicle to start off smoothly. In shifting from a lower to a higher gear, the engine will be decelerated in the same manner as the clutch is released and again accelerated as the clutch is reengaged. In stopping the tractor, the releasing of the clutch will again automatically decelerate the engine. Should the hooks 35 fail to frictionally engage the rod 21, they will engage the lever 19 to accomplish the same result. When the strand 27 is in its normal position, the hooks 35 will be out of engagement with the rod 21 so that it can move freely therein, in response to governor 19.

From the foregoing it will be readily apparent that the hand throttle can be set at the desired operating speed and with the throttle attachment 22 applied, the engine will be accelerated and decelerated in starting, stopping and shifting gears to eliminate jerking of the vehicle and unnecessary racing of the engine and clashing of the gears. Further, the engine will be accelerated gradually as the clutch is engaged to prevent spinning of the driving wheels by the gradual disengagement of hooks 35 from the rod 21. It will thus be readily apparent that the attachment 22 will effect a considerable saving in wear and tear on the various moving parts of the tractor and will effect a considerable saving in fuel consumption.

Various modifications and changes are contemplated and may obviously be resorted to without departing from the spirit and scope of the invention as hereinafter defined by the appended claim.

I claim:

In an auxiliary throttle actuator for internal combustion engined vehicles, a linkage adapted to be connected at one end thereof to the fuel control valve of the carburetor of an engine and adapted to be connected at its opposite end to the engine clutch, said linkage being constructed and arranged to actuate the fuel control valve to decelerate the engine when the clutch is moved to a released position and to accelerate the engine as the clutch is moved toward an engaged position, said linkage including a flexible tubular conduit and a flexible shaft reciprocally disposed therein and forming the connection between the fuel valve of the carburetor and the vehicle clutch, a clamp connected to the flexible shaft and having depending oppositely directed hook portions disposed in spaced-apart relationship and adapted to releasably engage the actuating rod of the fuel valve to move the rod in one direction and to permit the rod to move relatively thereto in either direction.

SHIRLEY CLYDE COPELAND.

REFERENCES CITED

The following references are of record in the file of this patent:

UNITED STATES PATENTS

| Number | Name | Date |
|---|---|---|
| 1,160,640 | Morris | Nov. 16, 1915 |
| 1,375,436 | Young | Apr. 19, 1921 |
| 2,016,864 | Lange | Oct. 8, 1935 |
| 2,313,000 | Hauguel | Mar. 2, 1943 |